T. GRANBERY.
Bead Chain.

No. 232,814. Patented Oct. 5, 1880.

ATTEST:
Chas. Eben Brown
Edw. B. Spaulding

INVENTOR:
Theodore Granbery
By Burke Fraser & Cornett
Attys.

UNITED STATES PATENT OFFICE.

THEODORE GRANBERY, OF NEW YORK, N. Y., ASSIGNOR TO JENNIE L. GRANBERY, OF SAME PLACE.

BEAD CHAIN.

SPECIFICATION forming part of Letters Patent No. 232,814, dated October 5, 1880.

Application filed December 15, 1879.

*To all whom it may concern:*

Be it known that I, THEODORE GRANBERY, of the city, county, and State of New York, have invented certain Improvements in the Construction of Bead Chains or Necklaces, of which the following is a specification.

In the manufacture of necklaces and chains from beads of onyx and other stones and non-metallic substances it is usual to attach a metal ring or eye to each end of each bead and to pass the eyes through one another, after the manner of chain-links, and in the practice of this method great difficulty has been found in fixing the eyes to the beads in a substantial manner, so that they would not pull off when submitted to the strains to which such chains or necklaces are ordinarily subjected. The eyes have usually been fixed to plugs or pins which have been inserted into the opposite ends of a hole drilled through the bead, and there fastened either by wedging in tightly or by screwing in, cement being in either case first placed in the hole.

Another method consists in soldering one eye to a pin of the length of the bead, passing the pin through the hole, and then soldering the other eye to its other end; but only soft solder can be used to join the second eye to the pin, as the heat required for hard solder injures the material of the bead, and consequently the joint is weak.

Another method consists in fixing one eye to a tube and the other to a pin, inserting the tube through the hole, and inserting the pin into the tube, fastening it there with cement; but the pin is liable to pull out of the tube.

My invention provides a connection which is strong, durable, readily applied, and cheap.

It consists in fixing to each eye a pin whose length exceeds one-half the length of the hole, inserting these pins from opposite ends of the hole, so that they overlap, and causing them to interlock with each other by some suitable means, as will be fully hereinafter set forth.

Figure 1:
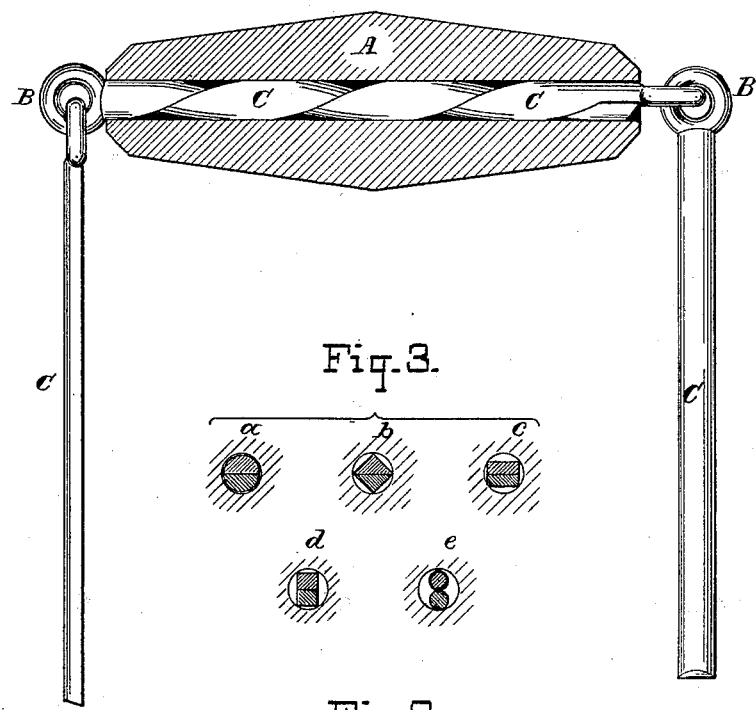
Figure 3:
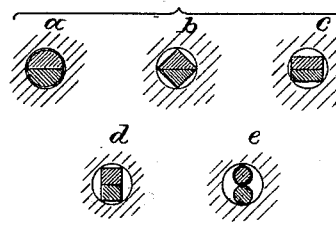
Figure 2:
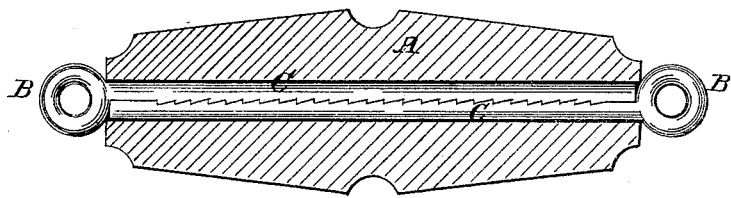

In the drawings, Figure 1 is an enlarged mid-section of a bead provided with eye-fastenings applied according to one form of my invention. Fig. 2 is a similar view, showing a modification of the method of applying the fastenings; and Fig. 3 illustrates, in transverse section, several different forms of pins.

Let A represent the bead, B B the eyes, and C C the pins attached to or forming part of the eyes. A hole is formed through the bead from end to end, or from side to side, as the case may be, and the pins C C are made of greater length than from the end of the hole to its center, so that when both are inserted in the hole from its opposite ends they will overlap to the desired extent. The pins may be made half-round, if desired, or of any of the other forms shown in Fig. 3. I prefer to have the pins extend nearly the entire length of the hole, that they may overlap the greatest possible distance, as shown in Fig. 1.

The overlapping pins C C having been inserted in the hole, I cause them to engage each other and interlock, so that they cannot be pulled out. This may be accomplished either by grasping the eyes B B and turning them in opposite directions, whereby the pins C C are twisted and wound around each other, as shown in Fig. 1, or the pins may be provided with a series of slight notches or serrations, as shown in Fig. 2, which, when the pins are in place, engage with each other by slightly springing together, and which may then be twisted or not, as preferred; or, in lieu of these methods, one pin may be provided with one or more backward barbs or spring-pawls, and the other may be similarly constructed, or be formed with ratchet-teeth, against which the barbs or pawls may catch and prevent the withdrawal of the pins. In either case, and especially with the construction shown in Fig. 2, I prefer to place a small quantity of cement in the hole before inserting the pins, in order to fill up the interstices and serve to intimately join the parts together, as is common. I thus secure all the strength resulting from the use of cement, which heretofore has been chiefly relied upon, and in addition my fastening possesses the greater strength resulting from the interlocking of the pins.

I prefer to twist the pins together, as shown in Fig. 1, as by this means they are slightly expanded laterally, so that they bind firmly against the surface of the hole.

I claim—

1. The improved method of securing eyes B B to a non-metallic bead, A, which consists in boring a hole through the bead, mounting each eye on a pin, C, whose length is greater than half the length of the hole, inserting the pins C C into the hole from its opposite ends, whereby they overlap in the hole, and causing them to interlock therein, so that they cannot be withdrawn, substantially as set forth.

2. A non-metallic bead, A, in the hole of which are arranged two overlapping and interlocking pins, C C, each of which bears a ring or eye, B, on its end, substantially as set forth.

3. The improved method of securing eyes B B to a non-metallic bead, A, which consists in boring a hole through the bead, mounting each eye on a pin, C, whose length exceeds half that of the hole, inserting the pins into the hole from its opposite ends, whereby they overlap, and twisting them therein by turning the eyes, whereby they are twined about each other and are expanded against the wall of the hole.

4. The combination of the bead A, the eyes B B, and the pins C C, fixed to the eyes, inserted into the hole in the bead from its opposite ends, of such length as to overlap therein, and twisted together, whereby they are laterally expanded against the wall of the hole.

In witness whereof I have hereunto signed my name in the presence of two subscribing witnesses.

THEODORE GRANBERY.

Witnesses:
HENRY CONNETT,
ARTHUR C. FRASER.